Feb. 1, 1966 F. E. BUSCHBOM 3,232,456
SILO UNLOADER

Original Filed May 6, 1960 5 Sheets-Sheet 1

INVENTOR.
FLOYD E. BUSCHBOM
BY
Moore, White & Burd
ATTORNEYS

Feb. 1, 1966  F. E. BUSCHBOM  3,232,456
SILO UNLOADER
Original Filed May 6, 1960  5 Sheets-Sheet 2

INVENTOR.
FLOYD E. BUSCHBOM
BY Moore, White & Burd
ATTORNEYS

Feb. 1, 1966    F. E. BUSCHBOM    3,232,456
SILO UNLOADER
Original Filed May 6, 1960    5 Sheets-Sheet 3

INVENTOR.
FLOYD E. BUSCHBOM
BY Moore, White & Burd
ATTORNEYS

Feb. 1, 1966   F. E. BUSCHBOM   3,232,456
SILO UNLOADER

Original Filed May 6, 1960   5 Sheets-Sheet 4

INVENTOR.
FLOYD E. BUSCHBOM
BY Moore, White & Burd
ATTORNEYS

Feb. 1, 1966   F. E. BUSCHBOM   3,232,456
SILO UNLOADER
Original Filed May 6, 1960   5 Sheets-Sheet 5
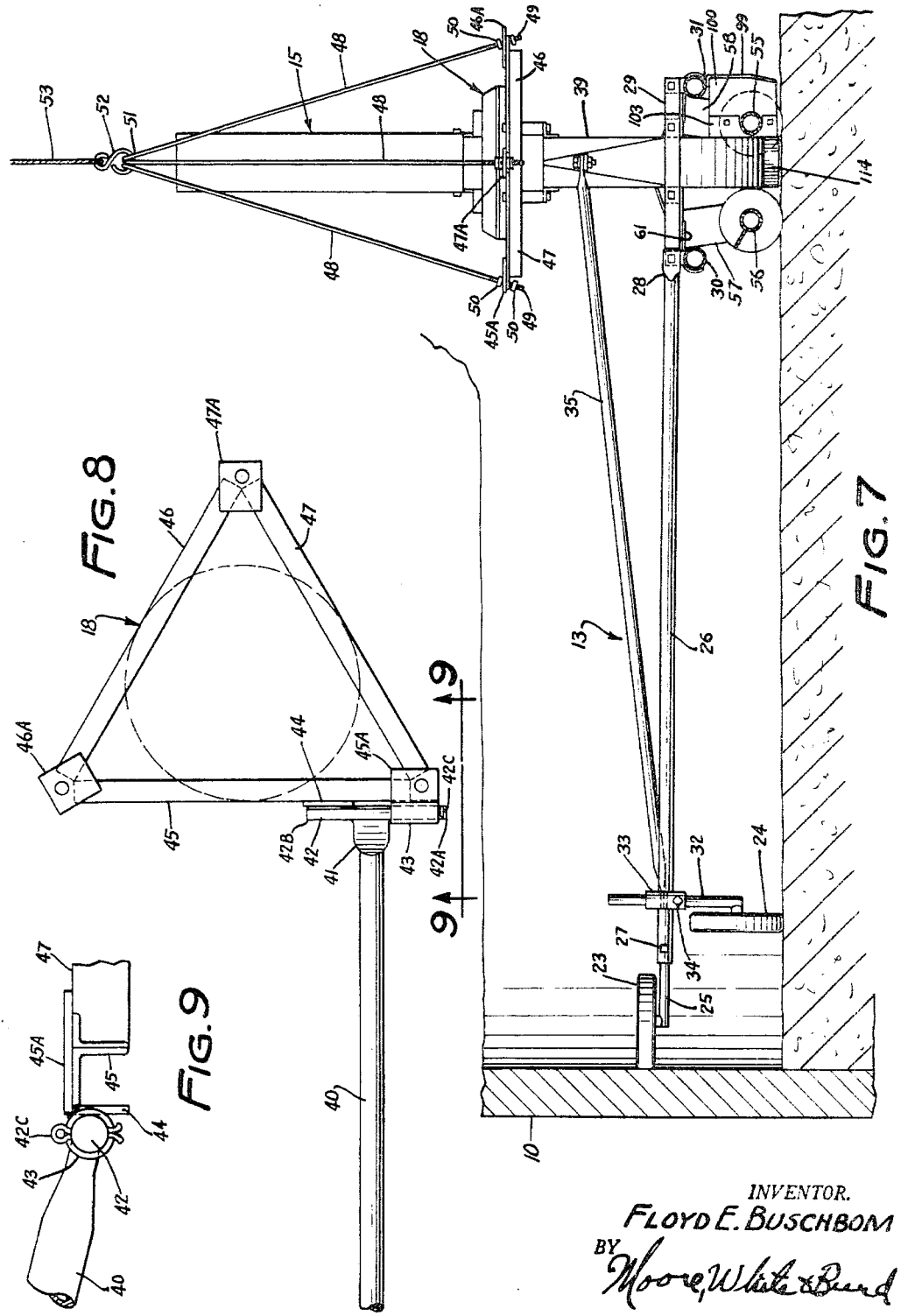
INVENTOR.
FLOYD E. BUSCHBOM
BY Moore, White & Burd
ATTORNEYS

United States Patent Office 3,232,456
Patented Feb. 1, 1966

3,232,456
SILO UNLOADER
Floyd E. Buschbom, Long Lake, Minn., assignor to Vandale Corporation, Hennepin, Minn., a corporation of Minnesota
Original application May 6, 1960, Ser. No. 27,435. Divided and this application May 22, 1963, Ser. No. 282,475
13 Claims. (Cl. 214—17)

This application is a division of Serial No. 27,435, filed May 6, 1960, now abandoned, for Unloader.

This invention relates to new and useful improvements in unloaders for silos or the like, as exemplified by top surface unloaders such as shown in Van Dusen Patent 2,719,058, and Buschbom Patents 2,794,560 and 2,877,907.

While great strides have been made in the silo unloader art and an unloader for positioning on the top surface of ensilage within a tower silo and for unloading the ensilage from such silo has now become feasible, as shown in the foregoing patents, numerous problems have remained, and improvements have been sought. It is to some of these problems that this invention is directed.

A general object of this invention is to provide a silo unloader having new and improved features.

A further object of this invention is to provide new and useful closure structure for the collector arm of a silo unloader, providing substantial safety for the operator and precluding inadvertent engagement of the collector arm mechanism with extraneous objects.

A further object of this invention resides in new and useful structure for joining the torque arm of a silo unloader to the unloader frame.

A further object of this invention resides in the utilization of new and improved collector arm closure structure serving as means for supporting an adjustably positioned counterweight.

A further object of this invention resides in a counterweight slide for a silo unloader collector arm forming a portion of the collector arm and closure means.

Still a further object of this invention resides in the cooperation of the collector arm and closure means with the center impeller housing of a silo unloader.

Still a further object of this invention resides in the specific collector arm structure and its cooperation with the central impeller for efficient feeding of the ensilage into the central impeller.

Still a further object of this invention resides in the provision of the collector arm having new and unique flighting arrangement for cooperation with the silo unloader impeller housing.

Still a further object of this invention resides in new and useful structural improvements in the central impeller structure for providing more efficient material flow.

Yet a further object of this invention resides in the specific structure of the new and useful central impeller rotor.

Yet a further object of this invention resides in the specific configuration of the central impeller housing.

Yet a further object of this invention resides in the new and useful guide structure of the invention whereby horizontal positioning of the guide means adjacent the silo wall is provided.

Another object of this invention resides in the structural details of the silo unloader support tripod means.

A still further object of this invention resides in the accessibility of the adjusting structure for determining the longitudinal position of the guide wheels relative to the collector arm.

Other and further objects of the invention are those inherent and apparent in the structure as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to corresponding parts and in which:

FIGURE 7 is a fragmentary elevational view showing the guide wheel structure of the instant invention;

FIGURE 8 is an enlarged fragmentary plan view showing the means by which the torque arm is connected to the silo unloader support triangle; and FIGURE 9 is a fragmentary elevational view taken along the line and in the direction of the arrows 9—9 of FIGURE 8.

Figure 1:
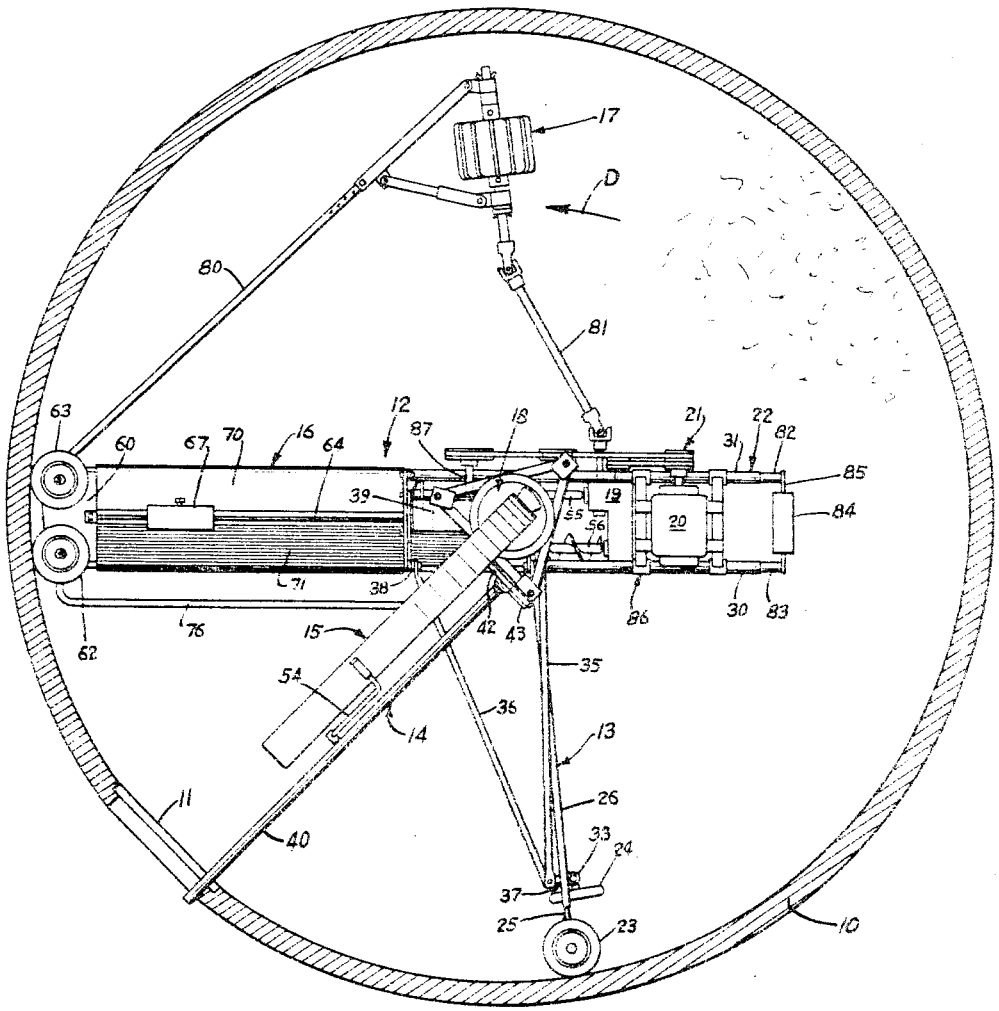
FIGURE 1 is a top plan view of the silo unloader of this invention in position on the top surface of ensilage within a tower silo (shown in horizontal section)

Reference is now made to the drawings, and specifically to FIGURE 1, for the following description. In FIGURE 1, there is shown the confining wall 10 of a conventional tower silo, the wall 10 being constructed of concrete staves, wood or other appropriate material. The wall 10 is usually only of more or less circular configuration, since silos are usually out-of-round. As is well known, the silo is provided with a plurality of vertically aligned apertures, open down to the level of the ensilage and closed below that point. The aligned vertical apertures are separated by cross bars one of which is shown at 11 in FIGURE 1. The silo and unloader cooperate in the manner described in Patents 2,719,058, 2,794,560 and 2,877,907 and reference is made thereto for more specific details of such background cooperation.

The silo unloader generally designated 12 is shown in plan in FIGURE 1 and includes a guide arm assembly generally designated 13, a torque arm assembly generally designated 14, a chute generally designated 15, a collector arm generally designated 16, a drive hub assembly generally designated 17, a suspension ring assembly 18, and gear box assembly 19, motor 20, drive structure 21 and frame 22.

Guide arm assembly 13 includes a wheel 23 journalled about a vertical axis, and a wheel 24 journalled about a horizontal axis, all perhaps best shown in FIGURE 7. Wheel 23 is journalled on a guide arm extension 25 which is in the form of a rod having an outside diameter slightly smaller than the inside diameter of guide arm 26, which is a sleeve or pipe, so that extension 25 may be inserted therein and extended or retracted for adjustment (moved leftwardly or rightwardly with reference to FIGURE 7). When proper adjustment is secured, it is secured fixedly therein by set screw 27 or other suitable means.

Figure 2:
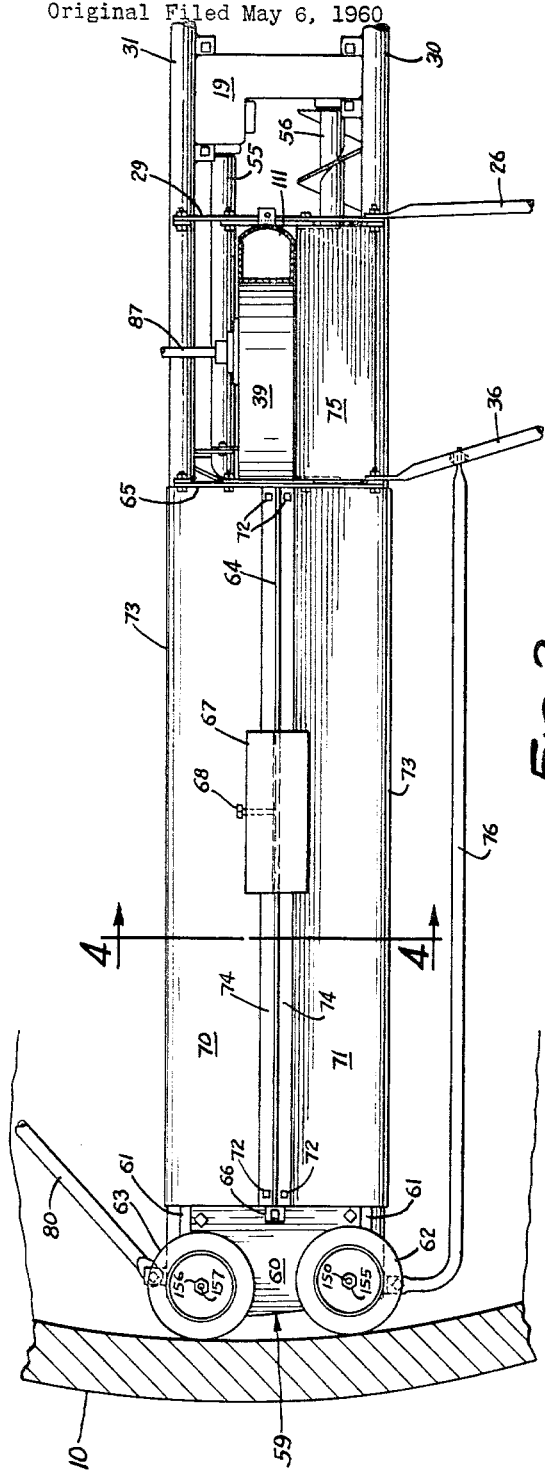
FIGURE 2 is an enlarged fragmentary plan view of the collector arm structure of FIGURE 1.

Arm 26 is flattened at end 28 and bolted to the strap member 29 extending between and secured by lugs to frame members 30 and 31. This is best shown in FIGURES 1, 2 and 7.

Wheel 24 is journalled to a guide arm support rod 32 received in a short sleeve 33 welded or otherwise secured to the advance side of the arm 26. It may be moved upwardly or downwardly therein, since the external diameter of rod 32 is slightly less than the internal diameter of the sleeve 33, and then positioned securely by set screw 34, or other appropriate means.

An upper guide arm brace 35 and a lower guide arm brace 36 are each bolted by a flattened end to a lug 37 positioned on the trailing side of guide arm 26. These arms diverge from that point, arm 36 being bolted by a flattened end to the frame at lug 38 and arm 35 being bolted to the impeller housing 39 by having its flattened end seated on an extending lug and bolted thereto. The upper and lower guide arms thus assume the position shown in FIGURES 1 and 7.

The torque arm assembly, generally designated 14, is shown best in FIGURES 1, 8 and 9. The assembly comprises an elongated tubular member or bar 40 having an extension such that it extends through the silo wall 10. As stated previously, silos, although designed to be substantially circular, are usually out-of-round. In addition, the unloader is designed, as stated in Van Dusen Patent 2,719,058, to have a collector arm extension which is greater than the radius of the silo, so that the center of the unloader orbits about the center of the silo. Hence, rod 40 must be of such an extension as to accommodate the axial reciprocation of the unloader with respect to silo wall 10. Rod 40 is flattened at one end 41 as perhaps best shown in FIGURE 8, and has welded or otherwise secured thereto, a bar 42 which in cooperation with rod 40 forms a T. Bar 42 extends on either side of flattened end 40 as shown in FIGURE 8. One end 42A passes through sleeve 43 and is maintained in position by a cotter key 42C for pivotal movement about a horizontal axis therein. The other end 42B of bar 42 engages a bearing plate 44 depending from angle member 45 of a supporting tripod 45–47. Since the collecting arm 16 moves in the direction of the arrow D within the silo, it will be appreciated that the rod 40 will assume the position of FIGURE 1, that is, adjacent the edge of the silo aperture, which is in the direction of travel of arm 16, or what may be called the leading edge of the aperture. In this position, end 42B will bear against plate 44 to maintain the supporting triangle 45–47 in the position shown and to preclude rotation of it, the suspension and support ring 18 and chute 15.

Members 45, 46 and 47 form the arms of the supporting triangle and are of angular vertical cross section as shown in FIGURE 9. Their ends terminate and are welded to three plates 45A, 46A and 47A. Plates 46A and 47A are identical. Plate 45A has welded thereto the sleeve 43 previously described. Each of the plates 45A–47A is apertured to receive a stiff rod 48 which is threaded at its lower end 49 and provided with a plurality of nuts 50. At its upper end 51, it is turned to receive a loop of S-hook 52, the other loop of which is secured to the silo unloader suspension cable 53 which is used for elevation of the silo unloader when necessary as well as to provide partial support as described in Patent 2,719,058.

The nuts 50 will be adjusted upwardly or downwardly on the threaded end of rod 48 to vary the effective length of the rod, both for accurate levelling of the silo unloader initially and to lower or elevate the support triangle 46–47 at any corner to determine the pressure that will be brought by the collector arm on the ensilage at a particular place as it travels its circular path within the silo so as to meet any unusual condition within the silo such as hard material in a particular place or the like.

The use of stiff, substantially inflexible rods 48 instead of flexible cables insures that if the collector arm 16 should drop at any particular time, as due to a soft spot in the ensilage or the like, tension will be exerted on the adjacent rod or rods 48 and the silo unloader will tend to pivot about a horizontal axis forcing the rod or rods on the opposite side of the collector arm to elevate, thus moving hook 52 over center and toward the silo wall in the direction of the so dropping collector arm. Such similar levelling action results if the collector arm should elevate at a hard spot. Such action will meet a substantial resistance due to the weight of the unloader on the cable 53 and thus there is provided a further levelling action by use of the three adjusting rods 48, instead of flexible cables.

The triangle 45–47 is bolted or otherwise suitably secured to the collector ring assembly 18 which serves not only as a suspension and support ring assembly but to transfer electricity from an appropriate source of power to the motor 20. Such structure is shown generally in Patent 2,794,560 and the specific ring used is shown in co-pending application Serial No. 814,915, now abandoned. Reference is made to these for a more complete explanation of the ring assembly, although since it forms no part of the invention per se, it is not explained in greater detail.

Secured to the top of the ring 18 is a chute generally designated 15 of the type shown in Patent 2,877,907, supported by a rod 54 from a sleeve pivoted on a stud attached to torque arm 40, rod 54 having an upper turned end positioned in a second suitable sleeve secured to chute 15.

The collector arm assembly of this invention comprises the frame members 30 and 31, previously described, extending the full length of the unloader as shown in FIGURE 1. These frame members are appropriately braced at suitable intervals. Bolted or otherwise secured by lugs thereto to depend therefrom and be supported thereby, is a gear box assembly 19, which supports one end of each of the shafts 55 and 56 for the collector arm augers 55A–B and 55C–D. The other ends of shafts 55 and 56 are journalled in suitable bearings in depending members 57 and 58 of outboard frame support 59 and each having a wall cleaner 59A secured thereto as shown in Patent 2,719,058, which need not be explained in further detail here.

The outboard frame support 59 has a flat horizontal plate portion 60 joined to and extending between frame members 30 and 31. Plate portion 60 is bolted to a pair of flat strap members 61 in turn welded to members 30 and 31.

Figure 4:
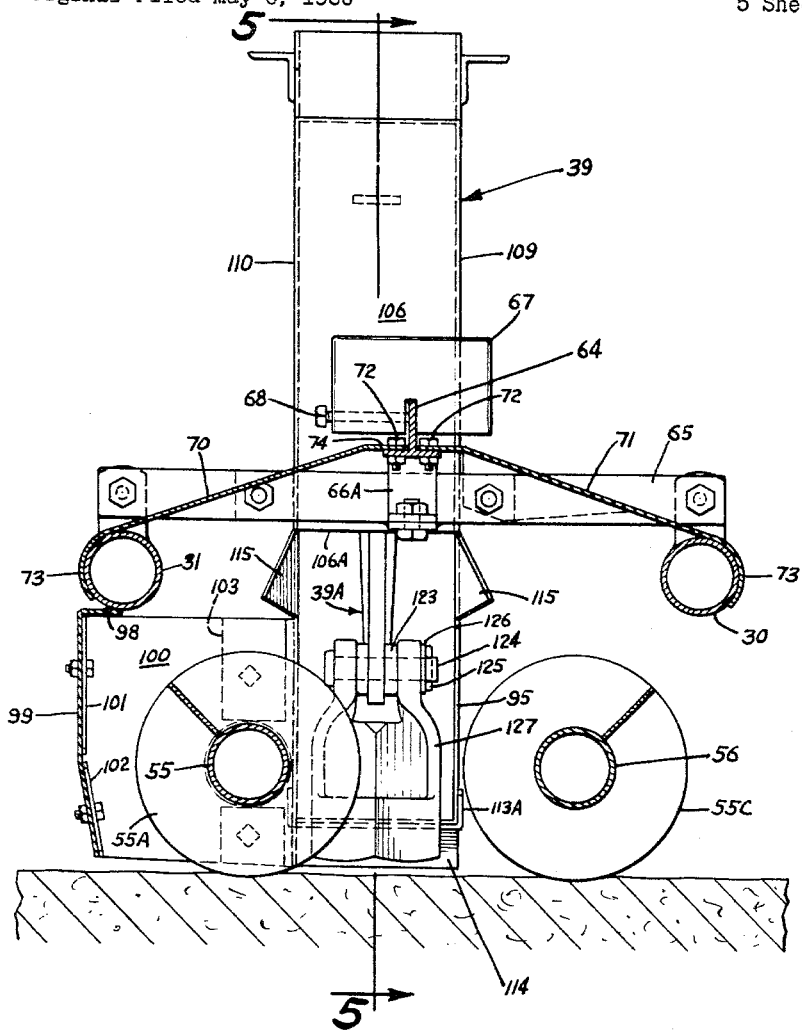
FIGURE 4 is a vertical sectional view on an enlarged scale, taken along the line and in the direction of the arrows 4—4 of FIGURE 2.
Figure 6:
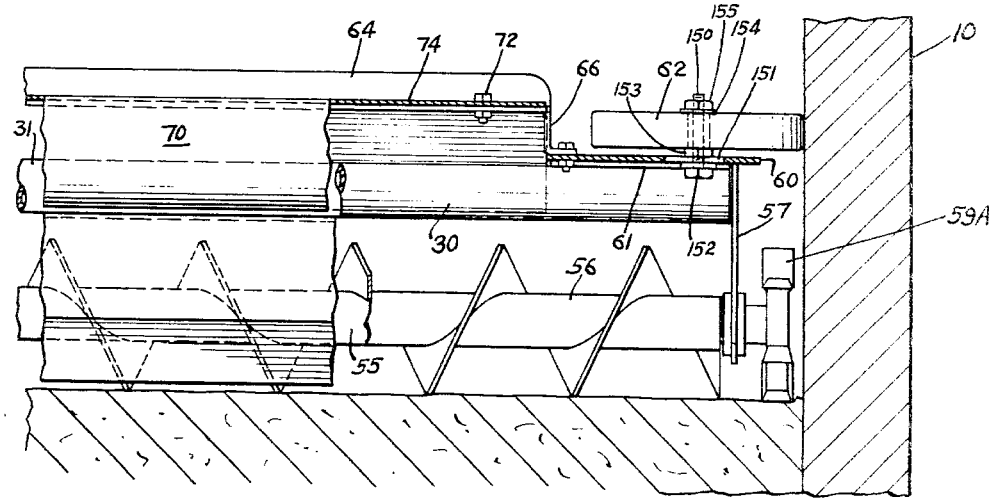
FIGURE 6 is a fragmentary enlarged elevational view, partially broken away, of the end of the collector arm adjacent the silo wall.

Guide wheels 62 and 63 are journalled on plate 60 for rotation about a vertical axis, and for engagement with the interior surface of the silo wall 10 for guiding the unloader in its travel within the silo and for positioning wall cleaners 59A with respect to the silo wall as shown in FIGURE 6. A T-bar 64 extends between plate 60 and cross brace 65. Brace 65, as shown in FIGURE 2, extends between members 30 and 31 and is bolted to lugs upstanding therefrom. T-bar 64 is secured by a foot 66 bolted or otherwise affixed to plate 60 and by a second inturned foot 66A bolted or otherwise secured to cross brace 65. Positioned on the T-bar 64 as shown best in FIGURE 4 is a weight 67 having a set screw 68 for positioning it after it has been adjusted by sliding it inwardly or outwardly on bar 64 (rightwardly or leftwardly with reference to FIGURE 2). Thus, the weight 67 serves as an adjustable means for controlling the pressure which the outward end of the collector arm engages on the ensilage.

Two top shield members 70 and 71 are positioned to extend from overlying engagement with one of the flanges of inverted T-bar member 64 downwardly and around their respective frame members 31 and 30. As shown, there are positioned on members 30 and 31 by having an edge curled thereabout and are secured to the T-bar by bolts 72. Thus, in removal or insertion the curled edge 73 would be positioned about its respective frame member and the opposite edge 74 positioned over the T-bar flange and bolts 72 inserted to retain the top shield portions 70 and 71 in position. However, if desired, rolled edges 73 may be otherwise secured to their respective frame members 30 or 31.

A front top shield 75 is provided of the configuration shown (FIGURE 2) and extends between members 29 and 65, being bolted to these members by downwardly turned ends. It closes the top of the unloader between the impeller housing 39, the frame member 30, and members 29 and 65.

A guard rod 76 extends between brace 36 and the outboard end of frame member 30, as shown in FIGURE 2. It is provided with flattened ends secured to lugs on these respective members.

The drive hub assembly 17 is provided with a tie bar 80, as shown in FIGURE 1, through which driving force is imparted to the unloader. It is also provided with a drive shaft 81 which serves to rotate the hub and which receives power from gear box assembly 19.

Frame extensions 82 and 83 are adjustably secured to frame members 30 and 31 (by set screws or the like, not shown) and support a counterweight 84 on a cross bar 85 extending therebetween. The motor 20 is mounted on a platform 86, supported on frame members 30 and 31 as shown in FIGURE 1. Through belt drives, as shown, the motor 20 drives the gear mechanism in housing 19 from which the auger shafts 55 and 56 are driven and from which the drive shaft 81 is driven. In such fashion motor 20 also drives the shaft 87 for the central impeller in housing 39.

Figure 3:
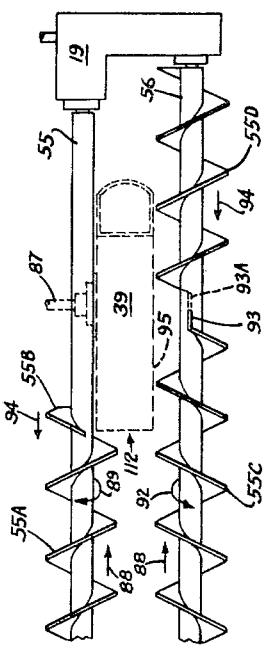
FIGURE 3 is a partial fragmentary plan, partial phantom view illustrating cooperation of the collector arm auger flighting structure with the central impeller.
Figure 5:
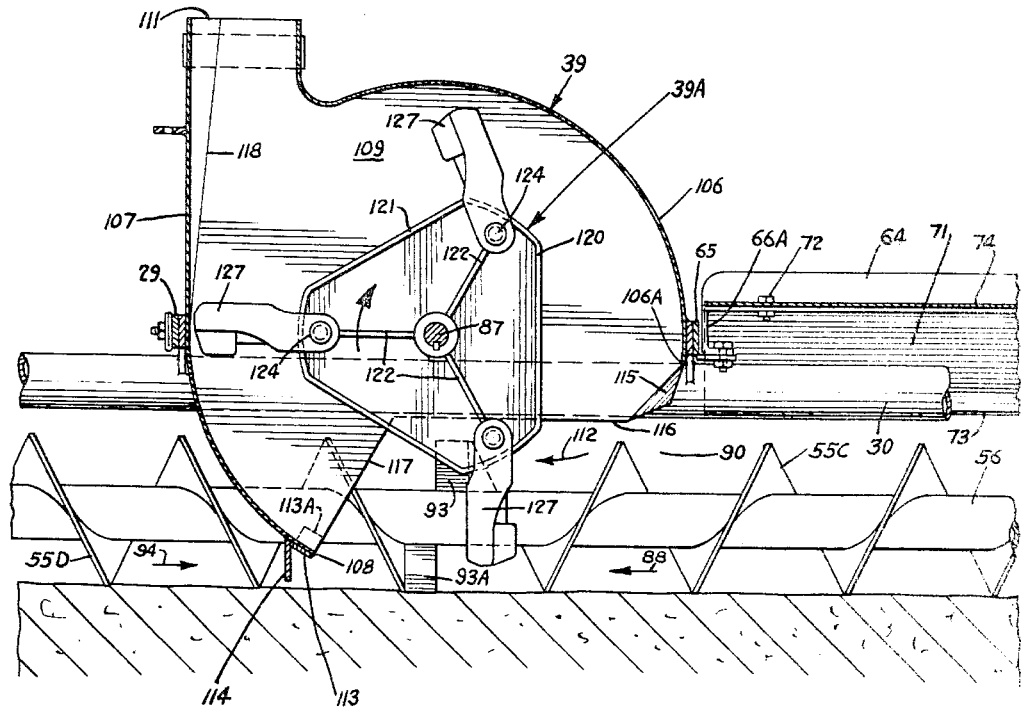
FIGURE 5 is a vertical sectional view taken along the line and in the direction of the arrows 5—5 of FIGURE 4.

As is shown in FIGURE 3, the auger flighting 55A is a righthand flighting when viewed in the direction of the arrow 88, in which direction material is conveyed as the shaft 55 rotates in the direction of the arrow 89. A reverse half flight section 55B is positioned in substantially continuous extension with flight section 55A and in the relation shown with reference to the front entrance 112 of impeller housing 39 as shown in FIGURE 5. This reverse flighting 55B blocks further travel of material in the direction of the arrow 88 adjacent the entrance to the impeller housing so that such material will be conveyed into the impeller at end 112.

The flighting 55C, when viewed in the direction of the arrow 88 is a lefthand flighting and serves to convey material in the direction of the arrow 88 as the shaft 56 rotates in the direction of the arrow 92. A flat straplike extension 93 is provided at the inboard end of flighting 55C, and at an axial position with reference to shaft 56 slightly to the outboard side of the intersecting prolongation of the axis of shaft 87.

Positioned on the opposite side of shaft 56 is a second straplike extension 93A which forms a continuation of the reverse flighting 55D which flighting conveys material in the direction of the arrow 94.

The particular cooperation of the forward and reverse flighting of the augers of the collecting arm, and the cooperation of the straplike members 93 and 93A with impeller housing 39 provides that material will be gathered and brought inwardly by the double augers, precluded from continuing along the rear of the impeller housing by flighting 55B, and brought into the impeller housing at front entrance and through its side entrance 95, flighting 55C serving to bring it inwardly to force it in at 90 and 95, straps 93 and 93A serving additionally to direct material inwardly in a direction axial to impeller shaft 87. Flighting 55D collects material and brings it into communication with blades or straps 93 and 93A to force a stream of material inwardly in a direction axial with shaft 87. Thus, it will be seen that material will enter the impeller housing at entrance 112 and entrance 95 by being urged in that direction through such cooperation.

Welded or otherwise secured to the bottom of frame member 31 by its inturned end 98 is a collector shield 99 which extends the length of auger flighting 55A-B. An end shield 100 is bolted by turned edges 101–102 to shield 99 and to a flange 103 of housing 39. Flange 103 has a cut-out portion to accommodate shaft 55 as shown in FIGURE 7.

The central impeller housing 39 comprises a front wrap 106 which terminates at 106A as shown. It also includes a rear wrap 107 terminating at edge 108 which with side plates 109 and 110 form a scroll housing having an outlet 111, a front entrance at 112, and a side entrance at 95. Rear wrap 107 is provided with a strap or plate member 113 having one edge flush with edge 108 and positioned therebeneath. It has upturned ends 113A which are positioned on plates 109 and 110 respectively and welded or otherwise secured thereto. Thus, member 113 serves to reinforce edge 108 and to provide a cutting edge, or dividing edge for the conveyed stream of material. Welded to the wrap 107 behind member 113 is a stop bar 114 extending thereacross which serves to collect ensilage which would otherwise pass therebeyond and retain it for accumulation and entrance into the impeller housing 39.

Each of the plates 109 and 110 flare outwardly adjacent edge 106A of wrap 106 to form outwardly extending triangular portions 115 as shown in FIGURE 4. While the rear plate 110 has a bottom edge which extends substantially circularly to its junction with portion 103, front plate 109 has a bottom portion removed to edge 116 in a vertical direction and to inclined edge 117 to form an obtuse angle cutout as shown in FIGURE 5. This is the cutout forming the side entrance previously designated 95.

Starting at portion 117 the rear wrap 107 is progressively rounded and front rear plates 109 and 110 bevelled so that they terminate at edge 118, to which the edges of wrap 107 are joined so that the exit 111 of the housing 39 assumes the rounded configuration shown in FIGURE 2.

The central impeller 39A comprises a central impeller disc 120 of the configuration shown best in FIGURE 5. It is keyed to shaft 87 and is formed from a circular segment with arcuate portions removed so that it assumes the configuration of a triangle with rounded corners as shown in FIGURE 5. It is provided with a peripheral strengthening flange 121 and radial strengthening flanges 122. It is also provided with a plurality of bosses 123 apertured to receive the pins 124 secured in position by cotter keys 125 and serving with washers 126 to retain the paddles 127 thereon. A plurality of three paddles is provided, each of the configuration shown and described in my application Serial No. 690,934, now Patent No. 2,958,412.

Guide wheels 62 and 63 may be adjusted longitudinally of the collector arm. The structure for accomplishing this adjustment is shown and described in relation to wheel 62 only. It consists of an axle bolt 150 which extends upwardly through a slot 151 in plate 60. The head 152 of the axle bolt 150 is below the plate. A jam nut 153 cooperates with head 152 to clamp axle bolt 150 in any desired position in the slot 151. Guide wheel 62 is held on the axle bolt rotatably by means of the washer 154 and the hub nut 155. When it is desired to adjust the longitudinal position of axle bolt 150, the hub nut 155 is removed which makes it possible to remove the guide wheel 62. Wrenches may then be applied conveniently to head 152 and jam nut 153 so that the latter can be loosened. Bolt 150 may then be longitudinally slid in slot 151 to the desired position and the jam nut 153 retightened. After this adjustment is made, the guide wheel may then be replaced and washer 154 and hub nut 155 returned to hold the guide wheel rotatably on the axle bolt 150.

Comparable structure secures guide wheel 63 to plate 60, the end of an axle bolt 156 and the hub nut 157 appearing in plan view, FIGURE 2.

From the foregoing it will be seen that there are provided certain new and useful improvements in silo unloaders designed to accomplish the foregoing objects of this invention.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. In a silo unloader collector arm having parallel and elongated frame members, the improvement of a center member elevated thereabove, depending shield means secured thereto, and said center member having track means extending substantially the length of said collector arm and counterweight means adjustably supported on said track means.

2. In a silo unloader having elongated collector arm means comprising a rotary auger assembly, the improvement comprising center means elevated above the auger assembly, top shield means for said collector arm means, first end shield means for said collector arm means, rear shield means for said collector arm means, a guard rod means positioned in front of said collector arm means and counterweight means adjustably supported on said center means.

3. The structure of claim 2 further characterized by a central impeller to which material is fed by said collector arm means and said top shield means extending alongside said central impeller to form a substantial top shield for said auger assembly.

4. The structure of claim 2 further characterized by said silo unloader having a central impeller having a housing and a closure extending between said rear shield means and said central impeller housing.

5. The structure of claim 1 further characterized by front and rear elongated auger members with an impeller housing positioned therebetween and having a lower tangential opening for receiving material therefrom and a vertically extending tangential opening for expelling material therefrom, said impeller housing having an open bottom portion and an open portion adjacent said front auger, said impeller housing having a closed portion adjacent said rear auger, said rear auger terminating at the adjacent end of said impeller housing, said rear auger having flighting to convey material to said impeller housing and a short section of reverse flighting precluding the conveying of material therebeyond, said front auger having flighting for conveying material toward said impeller housing along said open edge and terminating substantially at the axis of said impeller housing, a first flat upright member secured to said flighting for conveying material axially into said impeller housing, said front auger having a second flighting portion extending beyond said impeller housing and for conveying material in a direction reverse to said first flighting, and said second flighting portion having a flat member positioned opposite said first upright flat member.

6. The silo unloader of claim 2 in which there is a central impeller means positioned at the end of said elongated collector arm to which said elongated collector arm conveys materials, said elongated collector arm comprising front and rear rotary auger means extending substantially parallel to each other; said central impeller being between said front and rear augers, said front rotary auger extending in two directions from said central impeller means and the flighting of said front auger on each side of said central impeller means the reverse of flighting on the opposite end thereof; whereby materials are conveyed from both ends of said front rotary auger to said central impeller means and oppositely positioned, flat, upright members secured to said front rotary auger adjacent said central impeller.

7. The silo unloader of claim 2 in which said top shield means includes at its outer end a horizontal portion, a slot in said horizontal portion extending generally in a direction lengthwise of said elongated collector arm, a threaded and headed axle means inserted through said slot, with the head thereof below said horizontal shield portion, a nut on said axle means on the top of said top shield horizontal portion and a wheel means rotatably embracing said headed, threaded axle, a nut means securing said wheel on said threaded, headed axle means, said wheel means being of sufficient diameter to extend beyond the end of said elongated collector arm.

8. In a silo unloader having an elongated collector arm means including a rotary auger assembly, the improvement comprising top shield means for said collector arm means, guard rod means positioned in front of said collector arm means, elongated beam means extending throughout most of the length and elevated substantially above the longitudinal center of the auger assembly, said top shield means being in two pieces, each piece of which is secured to and extended divergently outwardly and downwardly from said elongated beam means, a counterweight slidably mounted on said beam means and means for fixing said counterweight on said beam means at a selected location.

9. In a silo unloader collector arm having parallel and elongated frame members, the improvement of a center member elevated thereabove, depending shield means secured thereto, said center member extending substantially the length of said collector arm and serving as a track means, an adjustable counterweight supported on the track means, said center member comprising an inverted T-beam, said top shield means secured thereto comprising two oppositely and downwardly diverging shield portions, said adjustable counterweight embracing an upwardly extending portion of said inverted T-beam and slidably extending therealong, and a clamp means secured to said adjustable counterweight clamping and releasing selectively said upwardly extending portion of said inverted T-beam.

10. In a silo unloader collector arm, an elongated frame means, elongated beam means extended substantially parallel to and positioned above said frame means, shield means positioned above the frame means and depending from and secured to said beam means, counterweight means slidably supported on said beam means and means mounted on said counterweight means for selectively clamping said counterweight means to said beam means at selected positions along the length thereof.

11. In a silo unloader collector arm, elongated frame means, elongated beam means extended substantially parallel to and positioned above said frame means, counterweight means positioned above the frame means and supported on said beam means, and means for selectively clamping said counterweight means to said beam means at selected positions along the length thereof.

12. In a silo unloader having elongated collector arm means including a rotary auger assembly, the improvement comprising center means elevated above and extended substantially longitudinally of the auger assembly, and counterweight means positioned above the auger assembly and adjustably supported on said center means.

13. In a silo unloader collector arm having substantially parallel elongated frame members, the improvement comprising elongated center means elevated above and projected substantially parallel to the frame member, shield means depending from and secured to said center means, and counterweight means mounted on said center means for adjustment at selected positions thereon.

(References on following page)

References Cited by the Examiner

UNITED STATES PATENTS

| | | | |
|---|---|---|---|
| 621,741 | 3/1899 | Blackburn | 308—16 |
| 813,022 | 2/1906 | Queneau | 198—104 |
| 1,301,642 | 4/1919 | Bradney et al. | 198—118 |
| 1,314,365 | 8/1919 | Ranck | 308—16 |
| 1,876,398 | 9/1932 | Carlstrand | 198—118 |
| 2,270,265 | 1/1942 | Carter | 198—104 |
| 2,500,043 | 3/1950 | Radtke | 214—17.84 X |
| 2,671,696 | 3/1954 | McLean. | |
| 2,877,907 | 3/1959 | Buschbom | 214—17 |
| 2,888,253 | 5/1959 | Van Dusen | 214—17.84 |
| 2,921,670 | 1/1960 | Albers | 198—204 X |
| 2,995,260 | 8/1961 | McCann et al. | 214—17 |
| 3,017,044 | 1/1962 | Englemann | 214—17.84 |
| 3,079,016 | 2/1963 | Dretzke | 214—17.84 |

GERALD M. FORLENZA, *Primary Examiner.*

HUGO O. SCHULZ, *Examiner.*

UNITED STATES PATENT OFFICE
CERTIFICATE OF CORRECTION

Patent No. 3,232,456 February 1, 1966

Floyd E. Buschbom

It is hereby certified that error appears in the above numbered patent requiring correction and that the said Letters Patent should read as corrected below.

Column 3, line 18, after "frame" insert -- 22 --; column 8, line 40, for "extending" read -- movable --; line 47, strike out "positioned above the frame means and".

Signed and sealed this 17th day of January 1967.

(SEAL)
Attest:

ERNEST W. SWIDER
Attesting Officer

EDWARD J. BRENNER
Commissioner of Patents